United States Patent
Keuler et al.

(10) Patent No.: US 11,788,460 B2
(45) Date of Patent: Oct. 17, 2023

(54) ACTIVE SURGE SUPRESSION THROUGH DYNAMICALLY CONTROLLED ACTUATED TURBOSHAFT SPEED

(71) Applicant: Garrett Transportation I Inc., Torrance, CA (US)

(72) Inventors: Jens Keuler, Leonberg (DE); Matthieu Gancedo, Redondo Beach, CA (US); Quentin Roberts, Chantraine (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/460,088

(22) Filed: Aug. 27, 2021

(65) Prior Publication Data
US 2023/0064305 A1 Mar. 2, 2023

(51) Int. Cl.
*F02B 37/12* (2006.01)
*F02B 37/04* (2006.01)
*F02B 39/10* (2006.01)

(52) U.S. Cl.
CPC .............. *F02B 37/12* (2013.01); *F02B 37/04* (2013.01); *F02B 39/10* (2013.01); *F02B 2037/122* (2013.01); *F02B 2037/125* (2013.01)

(58) Field of Classification Search
CPC .......... F02B 37/12; F02B 37/04; F02B 39/10; F02B 2037/122; F02B 2037/125
See application file for complete search history.

(56) References Cited

U.S. PATENT DOCUMENTS

| | | |
|---|---|---|
| 5,083,434 A | 1/1992 | Dahlgren et al. |
| 5,906,098 A | 5/1999 | Woollenweber et al. |
| 6,637,205 B1 | 10/2003 | Ahmad et al. |
| 6,705,084 B2 | 3/2004 | Allen et al. |
| 7,047,740 B2 | 5/2006 | Fukasawa et al. |
| 7,127,892 B2 | 10/2006 | Akins et al. |
| 7,805,939 B2 | 10/2010 | Kimoto et al. |
| 7,905,091 B2 | 3/2011 | Kassner |
| 10,422,289 B2 | 9/2019 | Xiao et al. |
| 2007/0269308 A1 | 11/2007 | Wood |
| 2009/0000298 A1 | 1/2009 | Barthelet |
| 2009/0214334 A1 | 8/2009 | Fukami |
| 2010/0278628 A1 | 11/2010 | Ooyama |

(Continued)

FOREIGN PATENT DOCUMENTS

| | | | |
|---|---|---|---|
| CN | 107327342 A | 11/2017 | |
| CN | 110067639 A | * 7/2019 | ............ F02B 37/001 |

(Continued)

OTHER PUBLICATIONS

Eriksson, "Modeling and Control of Turbocharged SI and DI Engines," Oil and Gas Technology, vol. 62, No. 4, pp. 523-538, 2007.

(Continued)

*Primary Examiner* — Ngoc T Nguyen
(74) *Attorney, Agent, or Firm* — Seager, Tufte & Wickhem, LLP

(57) ABSTRACT

Methods and systems for controlling a turbocharger associated with an engine. The turbocharger is operated in a region of operation creating potential surge conditions, but surge is avoided by varying the speed of the turbocharger in accordance with speed parameters determined by observing a resonant frequency of surge in the system.

19 Claims, 10 Drawing Sheets

(56) References Cited

U.S. PATENT DOCUMENTS

| | | | |
|---|---|---|---|
| 2015/0047605 A1* | 2/2015 | Buckland | F02B 37/164 |
| | | | 123/403 |
| 2015/0285257 A1 | 10/2015 | Anschel et al. | |
| 2016/0103012 A1 | 4/2016 | Liu | |
| 2016/0201693 A1 | 7/2016 | An et al. | |
| 2017/0370361 A1 | 12/2017 | Arnold | |
| 2019/0078587 A1 | 3/2019 | Zeng et al. | |
| 2019/0226390 A1 | 7/2019 | McConville et al. | |
| 2019/0226391 A1 | 7/2019 | Buckland et al. | |

FOREIGN PATENT DOCUMENTS

| | | | |
|---|---|---|---|
| EP | 1336737 A2 * | 8/2003 | F02B 37/005 |
| JP | 2016205301 A | 12/2016 | |

OTHER PUBLICATIONS

Herceg et al; U.S. Appl. No. 17/122,240 "Boost Pressure Control for Electrically Assisted Turbochargers," 35 pages filed Dec. 15, 2020.

* cited by examiner

ACTIVE SUPRESSION THROUGH DYNAMICALLY CONTROLLED ACTUATED TURBOSHAFT SPEED

BACKGROUND

Compressor surge is a known phenomenon that effectively limits the operational boundaries for engine systems that use a compressor, such as a centrifugal compressor serving as a component of a turbocharger, to boost the pressure of air entering the engine intake manifold. Such compression improves engine power and can be manipulated to aid in controlling other characteristics of engine performance and various modes of engine operation. Conditions that cause surge can result from a combination of the air mass flow through the compressor, the pressure ratio across the compressor, and the compressor speed, and are affected by the physical design of the compressor and surrounding componentry. For a given setup, a compressor operating at a given speed must maintain at least a minimum level of mass flow for a given pressure ratio to prevent surge. When surge happens, the compressed air or other gas downstream of the compressor reverses flow, causing noise, as well as wear and sometimes failure of the compressor or, if part of a turbocharger, the turbocharger itself.

To avoid surge in a turbocharger compressor, the typical approach is to monitor (directly or computationally) each of mass flow and pressure ratio, and to control turbocharger (and hence compressor) speed to ensure operation away from the "surge line." For such solutions, the surge line is typically identified or defined for a given system to provide some degree of margin away from conditions known to cause surge. It may be desirable, in some contexts, to operate the compressor/turbocharger in a less constrained fashion or with a wider overall engine operation range. New and alternative solutions are desired for the avoidance of compressor surge.

OVERVIEW

The present inventors have recognized, among other things, that a problem to be solved is the need for new and/or alternative methods of operation to allow operation of a compressor associated with an engine air intake in conditions that may cause surge.

A first illustrative and non-limiting example takes the form of a method of operating a compressor in an engine system comprising receiving a command to operate the compressor in an operating region of the compressor near a surge region of the compressor; and controlling a speed of the compressor in a varying fashion to provide an average speed determined from the command to operate while avoiding surge.

Additionally or alternatively, the compressor has an air intake and an air output, the engine has an intake manifold and an exhaust manifold with one or more combustion cylinders coupled to each manifold, and the compressor air output is provided to the intake manifold.

Additionally or alternatively, the step of controlling the speed of the compressor in a varying fashion comprises varying the compressor speed within boundaries set using a resonant frequency of surge vibrations for the engine system.

Additionally or alternatively, the compressor is part of a turbocharger having: the compressor; a turbine; a turbocharger shaft coupling the turbine to the compressor; and an electric motor configured to apply torque to the turbocharger shaft; further wherein the turbocharger is coupled to the engine as follows: the compressor is configured to provide compressed air to an intake manifold of the engine; and the turbine is configured to receive exhaust gasses expelled at an exhaust manifold of the engine; wherein controlling a speed of the compressor in a varying fashion comprises controlling electrical power provided to the electric motor.

Additionally or alternatively, the electric motor is configured to draw torque from the turbocharger shaft, and controlling the speed of the compressor in a varying fashion further comprises controlling the electric motor to draw torque from the turbocharger shaft.

Additionally or alternatively, the compressor is driven by a shaft which is coupled in turn to an electric motor for providing torque to the shaft, and controlling a speed of the compressor in a varying fashion is performed by varying a control signal provided to the electric motor causing the torque to vary.

Another illustrative, non-limiting example takes the form of a method of configuring and operating a turbocharger to operate in association with an engine, the method comprising: operating the turbocharger to generate a surge condition; measuring a resonance associated with the surge condition and storing data related to a frequency of the resonance; setting a speed variable for use in operation of the turbocharger in the region of the surge condition using the stored data related to the frequency of the resonance; and operating the turbocharger in the region of the surge condition by varying speed of the turbocharger using the speed variable.

Additionally or alternatively, the turbocharger comprises: a compressor; a turbine; a turbocharger shaft coupling the turbine to the compressor; and an electric motor configured to apply torque to the turbocharger shaft; further wherein the turbocharger is coupled to the engine as follows: the compressor is configured to provide compressed air to an intake manifold of the engine; and the turbine is configured to receive exhaust gasses expelled at an exhaust manifold of the engine; wherein operating the turbocharger in the region of the surge condition by varying speed of the turbocharger using the speed variable comprises controlling electrical power provided to the electric motor.

Additionally or alternatively, the electric motor is configured to draw torque from the turbocharger shaft, and operating the turbocharger in the region of the surge condition by varying speed of the turbocharger using the speed variable further comprises controlling the electric motor to draw torque from the turbocharger shaft.

Additionally or alternatively, operating the turbocharger in the region of the surge condition by varying speed of the turbocharger using the speed variable is performed by: receiving a target speed setpoint; varying the speed of the turbocharger about the target setpoint to cause an average speed of the turbocharger to match the target speed setpoint.

Another illustrative and non-limiting example takes the form of a method of mitigating noise, vibration and harshness (NVH) of an engine system having an engine with an intake manifold and a compressor for compressing air entering the intake manifold, the method comprising: sensing presence of NVH above a threshold for NVH; varying a speed of the compressor about a speed setpoint using at least one compressor speed test variation; and identifying a compressor speed test variation that causes a reduction in the sensed NVH.

Additionally or alternatively, the at least one compressor speed test variation is configured as a fixed variation of compressor speed about the speed setpoint.

Additionally or alternatively, the at least one compressor speed test variation is configured as a relative variation of compressor speed about the speed setpoint.

Additionally or alternatively, the method may further comprise storing the identified compressor speed test variation as an NVH mitigation; and during a later operation of the engine: sensing an NVH condition; and using the NVH mitigation to vary compressor speed to mitigate the NVH condition.

Additionally or alternatively, the method may further comprise storing the identified compressor speed test variation as an NVH mitigation; and during a later operation of the engine: sensing a surge condition; and using the NVH mitigation to vary compressor speed to mitigate the surge condition.

Additionally or alternatively, the method may further comprise storing the identified compressor speed test variation as an NVH mitigation; and during a later operation of the engine: determining that operating setpoints of the engine system are near a surge line for the compressor; and using the NVH mitigation to vary compressor speed to prevent surge while operating near the surge line.

Additionally or alternatively, the engine system comprises a throttle between the compressor and the engine intake manifold, the method further comprising storing the identified compressor speed test variation as an NVH mitigation; and during a later operation of the engine: responsive to a command, closing the throttle; and using the NVH mitigation to vary compressor speed to prevent NVH responsive to the throttle closing. In some examples, the NVH response may be amplified for purposes of addressing a surge condition by, for example, increasing the amplitude or frequency of the NVH response.

Additionally or alternatively, the engine system comprises a throttle between the compressor and the engine intake manifold, the method further comprising storing the identified compressor speed test variation as an NVH mitigation; and during a later operation of the engine: responsive to a command, closing the throttle; and using the NVH mitigation to vary compressor speed to prevent surge responsive to the throttle closing.

Additionally or alternatively, the method may include analyzing an operational state of the compressor, determining that the compressor is operating in proximity to a surge line, and concluding that the compressor is a potential source of the NVH before varying the speed of the compressor.

Additionally or alternatively, determining that the compressor is operating in proximity to a surge line is performed by reference to data from a compressor map.

Another illustrative, non-limiting example takes the form of an engine system comprising a compressor and an engine having an air intake coupled to the compressor for receiving compressed air therefrom, and an engine controller coupled to each of the compressor and the engine, the engine controller configured to receive a command to operate the compressor in an operating region of the compressor near a surge region of the compressor; and control a speed of the compressor in a varying fashion to provide an average speed determined from the command to operate while avoiding surge.

Additionally or alternatively, the compressor has an air intake and an air output, the engine has an intake manifold and an exhaust manifold with one or more combustion cylinders coupled to each manifold, and the compressor air output is provided to the intake manifold.

Additionally or alternatively, the engine controller is configured to control the speed of the compressor in a varying fashion by varying the compressor speed within boundaries set using a resonant frequency of surge vibrations for the engine system.

Additionally or alternatively, the compressor is part of a turbocharger having: the compressor; a turbine; a turbocharger shaft coupling the turbine to the compressor; and an electric motor configured to apply torque to the turbocharger shaft; further wherein the turbocharger is coupled to the engine as follows: the compressor is configured to provide compressed air to an intake manifold of the engine; and the turbine is configured to receive exhaust gasses expelled at an exhaust manifold of the engine; wherein the engine controller is configured to control a speed of the compressor in a varying fashion by controlling electrical power provided to the electric motor.

Additionally or alternatively, the electric motor is configured to draw torque from the turbocharger shaft, and the engine controller is configured to control the speed of the compressor in a varying fashion by controlling the electric motor to draw torque from the turbocharger shaft.

Additionally or alternatively, the compressor is driven by a shaft which is coupled in turn to an electric motor for providing torque to the shaft, and the engine controller is configured to control a speed of the compressor in a varying fashion by varying a control signal provided to the electric motor causing the torque to vary.

Another illustrative, non-limiting example takes the form of an engine system comprising an engine, a turbocharger for providing compressed air to the engine and receiving exhaust gasses from the engine, and an engine controller configured to operate the turbocharger to generate a surge condition; measure a resonance associated with the surge condition and storing data related to a frequency of the resonance; set a speed variable for use in operation of the turbocharger in the region of the surge condition using the stored data related to the frequency of the resonance; and operate the turbocharger in the region of the surge condition by varying speed of the turbocharger using the speed variable.

Additionally or alternatively, the turbocharger comprises: a compressor; a turbine; a turbocharger shaft coupling the turbine to the compressor; and an electric motor configured to apply torque to the turbocharger shaft; further wherein the turbocharger is coupled to the engine as follows: the compressor is configured to provide compressed air to an intake manifold of the engine; and the turbine is configured to receive exhaust gasses expelled at an exhaust manifold of the engine; wherein the engine controller is configured to operate the turbocharger in the region of the surge condition by varying speed of the turbocharger using the speed variable comprises controlling electrical power provided to the electric motor.

Additionally or alternatively, the electric motor is configured to draw torque from the turbocharger shaft, and the engine controller is configured to operate the turbocharger in the region of the surge condition by varying speed of the turbocharger using the speed variable by selectively commanding the electric motor to draw torque from the turbocharger shaft.

Additionally or alternatively the engine controller is configured to operate the turbocharger in the region of the surge condition by varying speed of the turbocharger using the speed variable by: receiving a target speed setpoint; varying the speed of the turbocharger about the target setpoint to cause an average speed of the turbocharger to match the target speed setpoint.

Another illustrative and non-limiting example takes the form of an engine system including an engine with an intake manifold, a compressor for compressing air entering the intake manifold, and an engine controller configured to sense presence of noise, vibration or harshness (NVH) above a threshold for NVH; vary a speed of the compressor about a speed setpoint using at least one compressor speed test variation; and identify a compressor speed test variation that causes a reduction in the sensed NVH.

Additionally or alternatively, the engine controller is configured such that the at least one compressor speed test variation is configured as a fixed variation of compressor speed about the speed setpoint.

Additionally or alternatively, the engine controller is configured such that the at least one compressor speed test variation is configured as a relative variation of compressor speed about the speed setpoint.

Additionally or alternatively, the engine controller is configured to store the identified compressor speed test variation as an NVH mitigation; and, during a later operation of the engine: sense an NVH condition; and vary compressor speed using the NVH mitigation to thereby mitigate the NVH condition.

Additionally or alternatively, the engine controller is configured to store the identified compressor speed test variation as an NVH mitigation; and, during a later operation of the engine: sensing a surge condition; and use the NVH mitigation to vary compressor speed to mitigate the surge condition.

Additionally or alternatively, the engine controller is configured to store the identified compressor speed test variation as an NVH mitigation; and, during a later operation of the engine: determine that operating setpoints of the engine system are near a surge line for the compressor; and use the NVH mitigation to vary compressor speed to prevent surge while operating near the surge line.

Additionally or alternatively, the engine system comprises a throttle between the compressor and the engine intake manifold, and the engine controller is further configured to store the identified compressor speed test variation as an NVH mitigation, and, during a later operation of the engine: close the throttle; and use the NVH mitigation to vary compressor speed to prevent NVH responsive to the throttle closing.

Additionally or alternatively, the engine system comprises a throttle between the compressor and the engine intake manifold, and the engine controller is further configured to store the identified compressor speed test variation as an NVH mitigation; and, during a later operation of the engine, close the throttle; and use the NVH mitigation to vary compressor speed to prevent surge responsive to the throttle closing.

Additionally or alternatively, the engine controller is configured to analyze an operational state of the compressor, determine that the compressor is operating in proximity to a surge line, and conclude that the compressor is a potential source of the NVH before varying the speed of the compressor.

Additionally or alternatively, the engine controller is configured to determine that the compressor is operating in proximity to a surge line is performed by reference to data from a compressor map.

This overview is intended to introduce to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
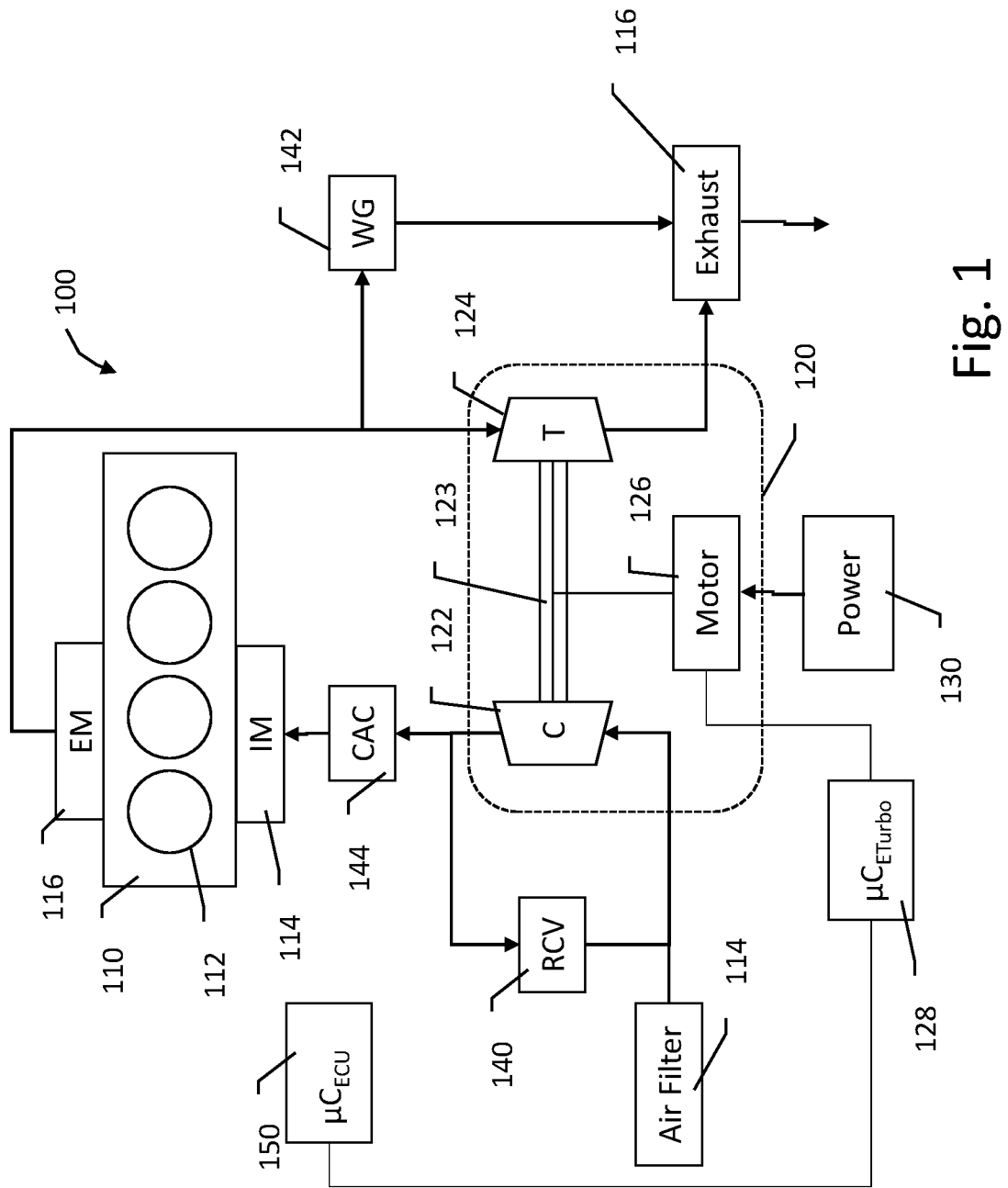
FIG. 1 shows an illustrative engine with a turbocharger.

FIG. 1 shows an illustrative engine with a turbocharger. The system 100 comprises an engine 110 having one or more cylinders 112 therein, in which air received at an intake manifold 114 is combined with injected fuel for combustion. Exhaust gasses from the cylinders 112 exit the engine 110 through an exhaust manifold 116.

The engine system includes a turbocharger 120 having a compressor 112 that compresses incoming air using torque received along a drive shaft 123 from a turbine 124. The turbine 124 is coupled to the exhaust airflow from the exhaust manifold 116 and obtains power from the exhaust air flow, converted to torque that is applied to the drive shaft 123.

The turbocharger 120 is shown also having a motor 126 that receives power from a power source 130, which may be a battery that obtains power from a battery charger (not shown) that is in turned powered either from the engine 110 drive shaft, or by placement of another turbine in the exhaust airflow (not shown). The inclusion of motor 126 makes the turbocharger 120 an electric-augmented turbocharger, or ETurbo. The turbocharger 120 may optionally include its own ETurbo controller 128. The motor 126 can be used to apply additional torque to the turbocharger shaft 123, increasing turbocharger speed. In some examples, optionally, the motor 126 may also be used to draw or remove torque from the turbocharger shaft, reducing turbocharger speed.

Other components in the system are shown as well, with focus for purposes of the present disclosure on the airflow system. Incoming fresh air comes through an air filter 114, which is provided to the compressor 122. A charge air cooler 144 is provided to cool the air exiting the compressor 122, which can enhance combustion characteristics (power and/or emissions) of the engine 110. A recirculation valve (RCV) is shown at 140, and controllably allows compressed air exiting the compressor 122 to be recirculated back to the input thereof to prevent surge conditions, as further explained below.

A wastegate (WG) 142 is illustrated in FIG. 1, and is positioned to allow exhaust gasses to controllably bypass the turbine 124, providing control over the turbocharger speed in some circumstances. The WG 142 may be a valve, for example. Rather than a wastegate 142, the turbine 124 may include a variable nozzle turbine (VNT) design, in which an actuator associated with the turbine 124 can be used to control exhaust gas passing through the turbine 124. WG and/or VNT may be omitted in other examples. While a simplified form is shown, more complex layouts can be used as well, such as including dual turbochargers, a twin scroll turbocharger, etc.

The system is also shown with an exhaust block 116, which may include various aftertreatment devices (catalytic converter, particulate trap, NOx filter, etc.). The exhaust block 116 may include additional features, such as a lambda sensor or universal exhaust gas oxygen (UEGO) sensor. The system optionally include, for example, of exhaust gas recirculation (EGR) devices, such as a high pressure EGR to controllably circulates exhaust gas from the exhaust manifold 116 back to the intake manifold, and/or a low pressure EGR to controllably circulate exhaust gas exiting the turbine 124 (and, typically, the soot trap) to pass back into the compressor 122.

The overall system is controlled by an engine controller which may be referred to as an engine control unit (ECU) 150. The ECU 150 may, as indicated, take the form of a microcontroller, microprocessor, state machine, or other suitable controller structure such as a set of logic and application specific integrated circuitry and memory, as desired (the same is true for the ETurbo controller 128).

A variety of sensors can be provided within the system. The sensors in any given installation can vary depending on a range of factors. Some illustrative sensors may include, for example and without limitation, ambient temperature, pressure, or other sensors used to determine the state of air entering the system through the air filter. A sensor may be provided to monitor the mass air flow into the system, if desired. A boost pressure sensor may be provided in some examples at the outlet (or "downstream of") the compressor 122. The intake manifold 114 of the engine 110 will typically include pressure and temperature sensors. Some installations can include an exhaust pressure sensor at the exhaust manifold 116. Temperature and/or pressure sensors can be provided elsewhere throughout the system, as desired.

In some installations, the engine control unit (ECU 150) is configured to monitor the state of operations in the system and calculates or estimates pressure, temperature and flow variables throughout the system with or without physical sensors. For example, knowing the temperature and pressure of air entering the system, and the pressure and temperature at the intake manifold, in combination with well developed models for the various components in the system, the boost pressure (that is the pressure at the outlet of the compressor 122) can be estimated reliably. The sensors associated with the exhaust 116, including a lambda sensor, can be used to determine additional characteristics including the burned fuel fraction.

Figure 2:
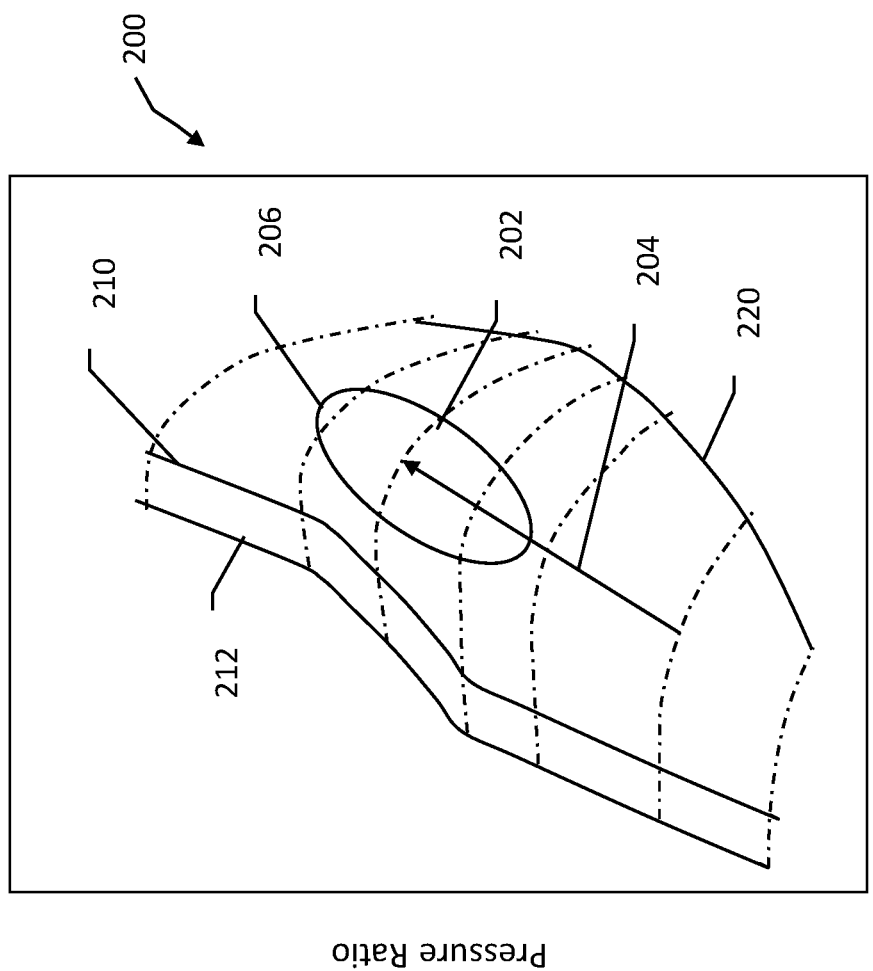
FIG. 2 shows an illustrative compressor map in simplified form.

The various system components and combination thereof create operational constraints on the system. Some of these constraints, particularly that of surge, derive from the compressor design, and can be understood by reference to the compressor map. FIG. 2 shows an illustrative compressor map in simplified form. The compressor map as shown includes an X-axis corresponding to the air mass flowing through the compressor, and a Y-axis corresponding to the pressure ratio as a function of the pressure downstream of the compressor divided by the pressure upstream of the compressor. The broken line curves crossing the map at 202 represent the compressor rotational speed. Arrow 204 indicates increasing compressor rotational speed. A compressor map 200 is often shown with efficiency islands 206 drawn thereon, reflecting regions of operation in which the efficiency of the compressor is higher than other areas.

Two operating constraints are illustrated in FIG. 2: the surge line 210, and the choke line 220. The surge line 210 represents conditions in which compressor surge becomes likely; operating to the left of the surge line 210 is generally avoided. Compressor surge occurs when the pressure ratio cannot be sustained by the mass of air flowing through the compressor, leading to reverse flow. Surge in general can be understood as resulting from unstable mass flow through the compressor wheel. When surge occurs under load various components of the compressor and/or turbocharger can be damaged, and performance of the engine is hampered. In addition, an engine system operated in a surge condition may experience excess noise, vibration and harshness (NVH).

At a more detailed level, surge manifests itself when, at a given pressure ratio, the compressor cannot sustain mass flow, which causes some of the mass flow to reverse flow. The turbine continues to deliver power to the compressor; due to the reverse flow, the compressor absorbs more power than the turbine provides and the turbocharger shaft decelerates. The pressure ratio then drops, and the mass flow resumes and temporarily stabilizes again. With the reduced turbocharger shaft speed due to deceleration, the turbine now provides more power than the compressor is using, accelerating the turbocharger shaft and increasing the pressure ratio until the mass flow reverses again. The result is an ongoing fluctuation of turbocharger shaft speed and charged air pressure, causing wear and failure, such as in the bearings present in the turbocharger.

Given the potential for damage to components, the surge line 210 may be defined at some distance from a line at which surge is actually observed to occur, such as line 212, providing some margin in the system. The choke line 220 reflects a constraint in which the air mass flowing through the compressor cannot be increased any further without changing some other operating parameter. Operational constraints can also be observed in the operation of a system. For example, when testing an engine configuration or build, an original equipment manufacturer may observe surge directly by criteria such as misfiring. The map shown in FIG. 2 is not intended to precisely reflect a particular build or build state, and is merely illustrative.

Figure 3:
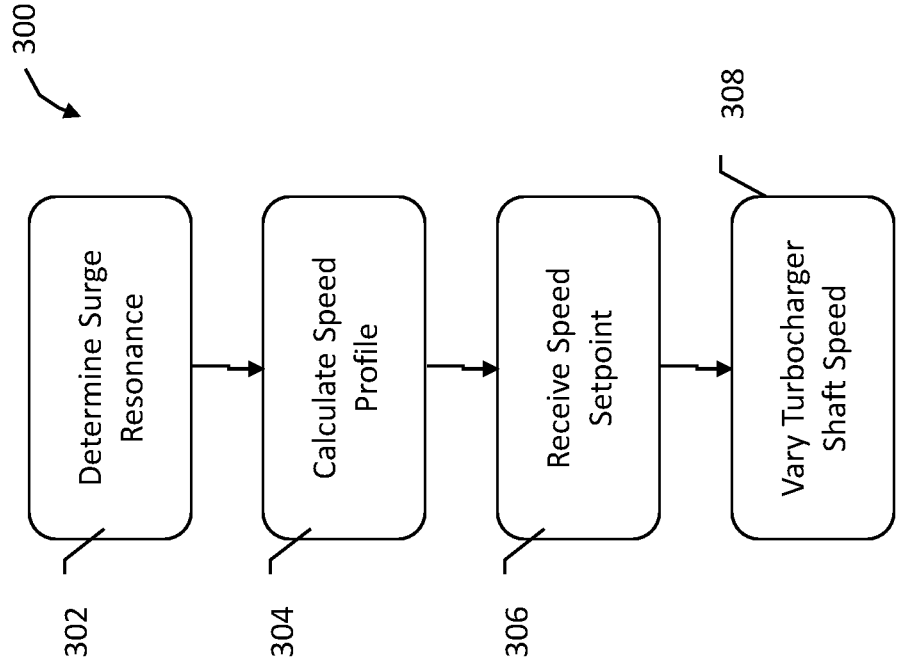
FIG. 3 shows an illustrative method of configuring turbocharger control.

FIG. 3 shows an illustrative method of configuring turbocharger control. The method begins at block 300 by performing a test to determine surge pulsation characteristics or "resonance" of a given combination of pipe connections to the compressor. The underlying test can be performed with or without the engine present, with or without combustion in the engine, and/or with or without the engine system being present in a functioning vehicle, though typically some degree of pipe connections intended for use in the eventual real-world application is included. In some examples, block 302 is performed on an assembled engine and compressor/turbocharger system (a "compressor test rig"), in order to avoid or simplify any issues related to the potential effects of the physical layout of the air flow system on surge. That is, for example and without limitation, when a compressor or turbocharger is placed on a gas stand setup, the piping and other associated physical structures may result in different surge characteristics than what may occur when the compressor or turbocharger is coupled to an engine in a real-world configuration. One reason for variance between the test stand and compressor test rig is that the volume of gas downstream of the compressor or turbocharger may be different, as would be the overall structure. While some examples may use the compressor test rig, or even a completed installation, other examples can be performed on a gas stand.

Monitoring surge resonance in block 302 can be performed in several different ways. Resonance can be measured, for example, by an acoustic or other mechanical sensor in or coupled to system under test (whether complete, test rig, or gas stand), such as by placing an acoustic or vibrations sensor in or on the compressor or turbocharger, or piping coupled thereto. Resonance may also be measured by monitoring turboshaft speed fluctuations, and, for an ETurbo configuration, by monitoring current or power draw of the ETurbo itself for variation over short time spans when the commanded speed is controlled to be constant.

The test in block 302 may be performed by a system operating an engine in an un-loaded, lightly loaded, or loaded configuration, although with the potentially destructive forces associated with heavily loaded surge, some examples may use an un-loaded or lightly loaded engine. The test as block 302 may be performed in a hot test configuration, in which the compressor test rig, minus any associated vehicle, is operated with internal combustion in a test stall, with associated hardware allowing various conditions, including a variety of load conditions, to be emulated. The test in block 302 may instead be performed using a cold test configuration, in which a compressor test rig is manipulated with an electric or other motor causing the engine to turn without ignition. Hot test and cold test operations may be performed as part of the manufacturing, serving as a quality test performed on the engine build prior to any placing the engine, for example, onto the chassis of the vehicle (or prior to shipping of the engine build).

In some examples, a cold test configuration may rely on an ETurbo configuration to use the electric motor of the ETurbo to spin the compressor without, or largely without, the application of effective force by the turbine. Some examples may be performed in a system that uses an electrically driven compressor, in which no turbine is present; that is, an e-compressor, rather than a turbocharger, may be used. If operating with an ETurbo version of a turbocharger, optionally, the turbine may be disconnected, if desired, reducing the turbocharger inertia and allowing easier control over the compressor speed by the ETurbo electric motor. Other examples will perform testing on a more complete rig. The test at block 302 may also be performed on a hot test configuration, in which the engine is operated via internal combustion, as desired, or on a full assembly of a vehicle, whether new or in a retrofit or repair operation.

In some examples, the test at 302 is an initial test, performed before developing the compressor map for the system. As a result, block 302 may include first determining that surge is occurring. Ongoing surge conditions in block 302 may be confirmed by monitoring for engine misfiring (for a hot test or fully built engine/vehicle), or for pressure fluctuations and/or pulsating noise (for any configuration). In some examples, a single sensor output or signal type may be used both for confirming the occurrence of surge as well as to determine the surge resonant frequency in block 302. For example, in a cold test, a number of sensors may be placed on the system under test for detecting vibration; those same vibration sensors can be used to identify the occurrence of surge as well as for determining what resonant frequency the surge phenomenon displays. As used herein, surge resonance can encompass any of the resonant frequency or any harmonics thereof that are present when surge is detected.

A speed profile is then calculated at 304, using the surge resonance. For example, surge resonance may be found to occur at a given frequency, f. The compressor speed may be varied in a range determined relative to f, such as within a range of +/−Pc, where c is a constant between 0.5 and 3, or between 1 and 2, or between 1.3 and 1.7. To provide a non-limiting, illustrative example, if the surge resonance is found to be at 50 Hz, then the compressor or turbocharger shaft speed may be varied by about +/−2700 RPM (taking 50 Hz times 1.3 as the value for c, and multiplying by 60 to convert to RPM), relative to an intended average compressor or turbocharger shaft speed. In some examples, the variation may be periodic, such as having a period in the range of about 0.1 milliseconds to about 2 seconds, for example. If the commanded speed is 50,000 RPM, then the controller may apply a time varying speed control signal to cause the actual turbocharger speed to vary between 47,300 RPM and 52,700 RPM, averaging over a selected time period of 1 millisecond to about 2 seconds (or more or less) to the target 50,000 RPM speed. The speed profile in this example, as that term is used, would be the determination of the boundaries of the variation (+/−2700 RPM in the example). The speed profile, in various examples, may be in the range of about +/−100 RPM to over 20,000 RPM. Moreover, the applied speed variation will have a frequency of such application, which may itself be random or periodic, as desired. By applying an active driving signal to the compressor, an active vibration damping method can be applied. In some examples, the applied variation may be random or semi-random, such as by using a random number generator to provide one or more parameters used in determining the variation.

A speed setpoint is then received at block 306, and the speed setpoint is implemented as indicated at 308 by varying the turbocharger shaft speed about the received speed setpoint. By varying the turbocharger shaft speed, the surge that results from operation in conditions that may be expected to cause surge (relatively low mass flow with relatively high pressure ratio) may be avoided entirely, or at least mitigated from hard surge (characterized by strong vibrations in the system potentially causing damage) to lesser phenomena including minor vibration and excess noise. In, for example, a cold test configuration, this method may be used to allow the cold test to be performed without allowing surge to damage any system componentry. Another potential benefit may be the ability to perform a cold test (or hot test) without the need for an enclosure and/or hearing safety equipment to be worn by the operator.

Figure 4:
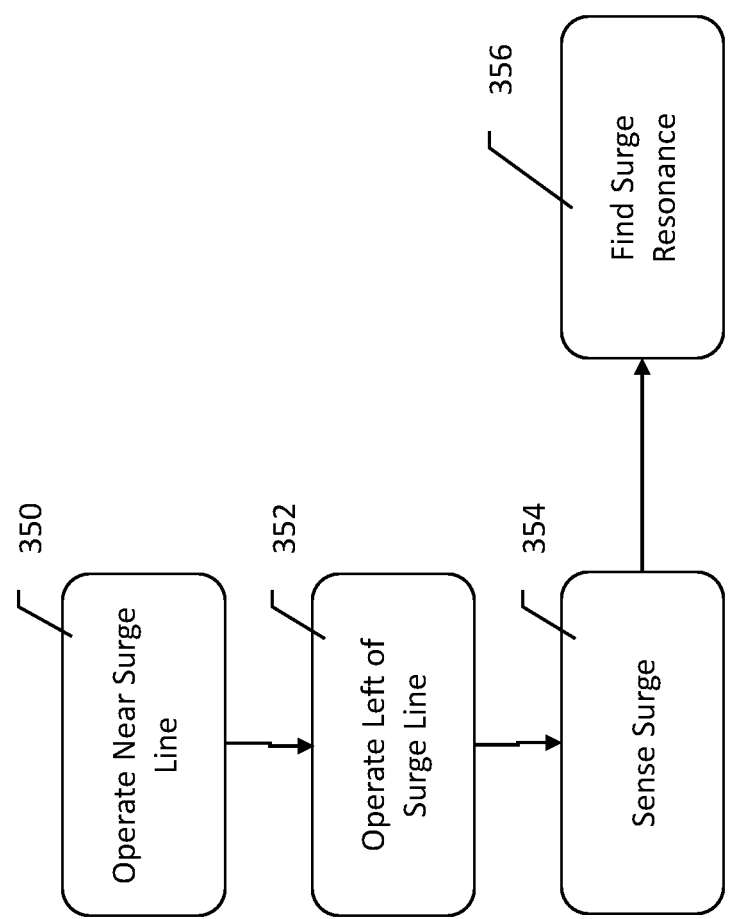
FIG. 4 shows in block form an illustrative method of obtaining surge data and operating a system.

FIG. 4 shows in block form an illustrative method of obtaining surge data. While FIG. 3 shows an example in which the surge compressor map is not necessarily available when the surge resonance is identified, FIG. 4 presumes a surge compressor map has been created. At block 350, the system is operated under conditions that are relatively near the surge line. Operation is then shifted to conditions that are likely to cause surge, that is, operation is to the left of the surge line, as indicated at 352. Surge is sensed at 354, and surge resonance is determined at 356.

Figure 5:
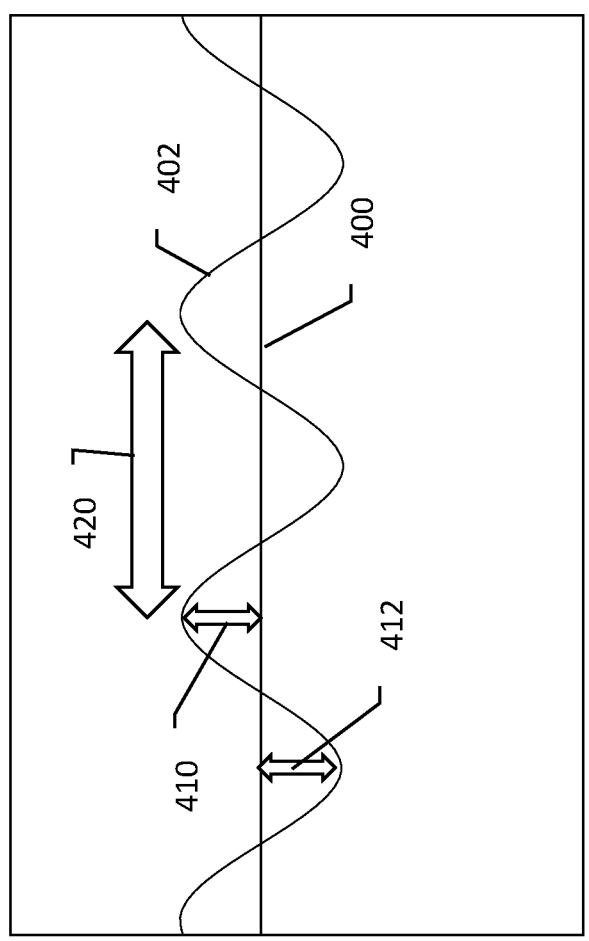
FIGS. 5-7 show illustrative examples for controlling turbocharger speed.
Figure 6:
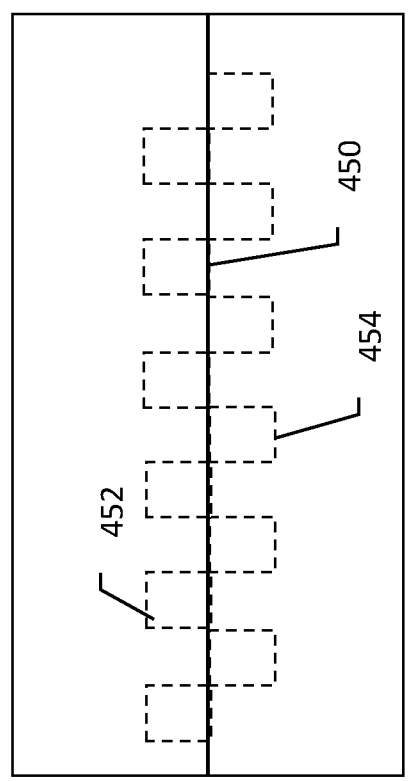
Figure 7:
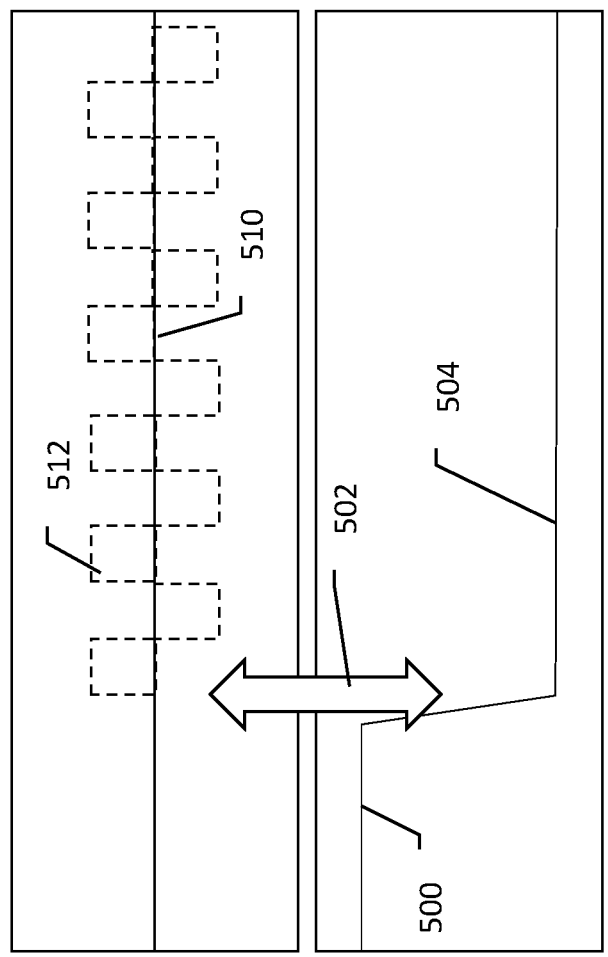

FIGS. 5-7 show illustrative examples for controlling turbocharger speed. FIG. 5 shows a graph of compressor or turbocharger speed over time. A target speed is shown at 400. A speed profile is applied, as indicated by the curving line 402, and the applied speed, that is, the speed generated in the compressor or turbocharger, varies above and below the target speed 400. The fluctuations or variations in speed have local maxima as shown at 410 and 412. The fluctuations 410, 412 have maximum values determined relative to the surge resonance determined using methods as in FIGS. 3 and 4. Over a relatively longer time interval, such as shown at 420, the average speed may equal or at least approximate the target speed 400. The length of interval 420 may be selected using various criteria, such as by setting a fixed rate for the fluctuations, by having interval 420 vary over time semi-randomly or in stochastic fashion, or by making interval 420 variable relative to the target speed 400. Interval 420 may be selected to minimize effects on other system components, or to make the fluctuations imperceptible to a driver (assuming operation in a vehicle setting), or to minimize the impact on the results of any tests being performed on the engine (assuming a cold test or hot test configuration, or testing being performed on a gas stand or in a vehicle or other build level under test). Interval 420 may be, for example, in the range of about 0.1 millisecond to about 5 seconds, or about 0.01 seconds to about 2 seconds.

The curving line 402 may in some examples reflect a speed of actual shaft rotation. In other examples, the curving line 402 may indicate a target speed being used by a controller as the speed setpoint for the shaft. For example, a PID control system may be used to determine the output of an ETurbo motor, and the setpoint applied by the PID control system may be varied as shown by line 402 the speed of a turbocharger shaft. In such a configuration, the speed setpoint is used to determine how much power (torque) is applied by the ETurbo to the turbocharger shaft, with the PID controller adjusting the current delivered to the motor, thus varying power applied to the shaft to vary actual speed relative to the target speed. In still another example, a model predictive control (MPC) algorithm may be used to determine a control solution using the speed profile, thus applying a series of control signal changes over time to achieve the target speed profile. In an example, the MPC approach can be used to account for power output by the compressor to the incoming air flow as well as the turbocharger inertia to provide control signals that can vary the turbocharger shaft speed in a predictive manner. Other suitable control algorithms can be used instead.

FIG. 5 suggests a near-sinusoidal speed profile. Other shapes can be used, such as a square shape as shown in FIG. 6. A sawtooth or other shape may be used. FIG. 6 shows an example in which a speed setpoint is shown at 450, however, a speed profile is applied using a square wave shape such that the applied control signals vary above 452 and below 454 the setpoint 450.

FIG. 7 shows an approach that is triggered responsively to sensed conditions. Here, the mass flow is shown at 500, and it can be seen that at time 502, the mass flow drops to a lower level. Such a change can occur, for example, when the throttle is closed in an operating system. Responsive to the throttle position change, or responsive to the calculated or sensed change in mass flow 500, the compressor or turbocharger shaft speed undergoes modulation using a speed profile as shown at 512, causing the compressor or turbocharger speed to vary above and below the setpoint 510.

In each of FIG. 5-7, an ETurbo configuration may use the ETurbo motor to apply torque or to draw torque from a turbocharger shaft responsive to the speed profile. For example, when the current speed of the turbocharger shaft is above the speed profile, torque may be drawn off of the turbocharger shaft, and when the current speed of the turbocharger shaft is below the speed profile, torque is added. In some examples, no torque draw is available, and instead a predictive approach (MPC, for example) can be used to aid in achieving the desired speed profile. In some examples, the actual speed may resemble a sawtooth pattern, as torque is applied for a first period of time and no torque is applied during a second period of time, causing the desired speed fluctuation.

Figures 8, 9:
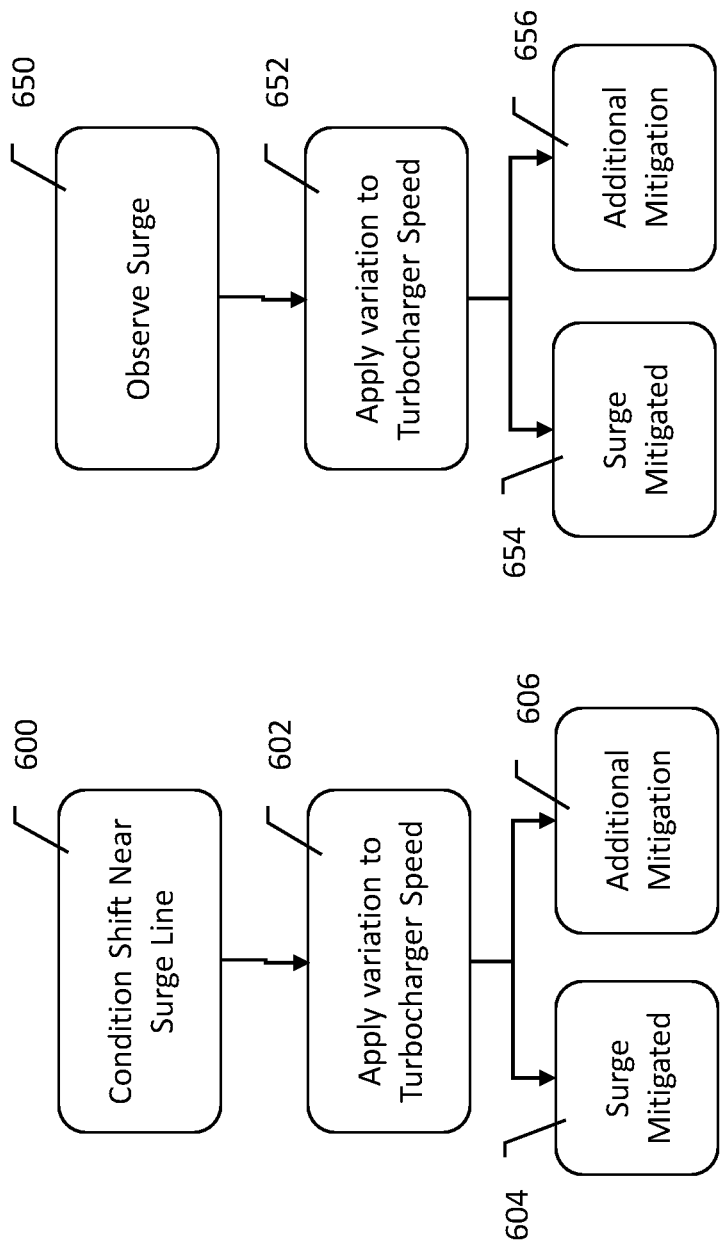
FIGS. 8-9 illustrate methods of surge mitigation.

FIG. 8 shows an illustrative method associated with that of FIG. 7. Here, the control system operates to identify a condition shift near the surge line of the underlying system at 600. The condition shift may be identified based on sensed or calculated system conditions, including pressure ratio, compressor speed, and mass flow, using the compressor map. In other examples, the condition shift may be identified whenever a perturbation occurs that is known to potentially cause surge conditions to arise, such as throttle closing, significant change in throttle position, or the closing of an RCV. Responsive to the change in conditions, the system applies variation to the turbocharger speed at block 602, using the already sensed (using a method such as those shown in FIGS. 3-4) resonance of surge.

If surge is avoided, as in no detected surge takes place or surge parameters do not arise with reference to the compressor map, no further action needs to be taken, as indicated at 604. If block 604 results, the system may remove the variation in speed applied at 602 after a predetermined time has expired, or on confirmation that conditions of surge (again with reference to the compressor map) do not arise or are no longer present. If surge conditions persist, or if surge is detected, a different mitigation may be implemented as indicated at 606, such as by opening the RCV or a blow off valve, if available. If present, an EGR valve (high pressure, for example) may be opened to allow additional mass flow. Other mitigations may include, as well, adjusting the operating setpoints of the system, or generating a signal to a system controller to indicate that the compressor operation is indicative of possible surge, and/or a request to modify one or more system parameters (opening the throttle, reducing the boost pressure setpoint, etc.) to move system operation away from the surge line.

FIG. 9 shows another responsive approach. Here, the method starts by observing surge at 650. Surge can be observed by, detected vibration or acoustic phenomenon, or by sensed perturbation of the turbocharger shaft speed due to changes in back forces occurring at the compressor. In response, the system initiates variations in turbocharger speed, again using the already determined surge resonance, as indicated at 652. The result can then be that surge is mitigated as indicated at 654 (similar to 604 in FIG. 8), or that further mitigation is needed, as indicated at 656 (similar to 606 in FIG. 8.

In FIG. 9, block 650 may be performed, as noted, by observing perturbations in turbocharger shaft speed. If, for example, noise dampening mechanisms are present in the system, a mechanical approach to sensing for surge may be of limited use except in extreme circumstances. Thus, the use of turbocharger speed sensing may be a useful alternative to the reliance on a mechanical sensor to identify surge in block 650.

Figure 10:
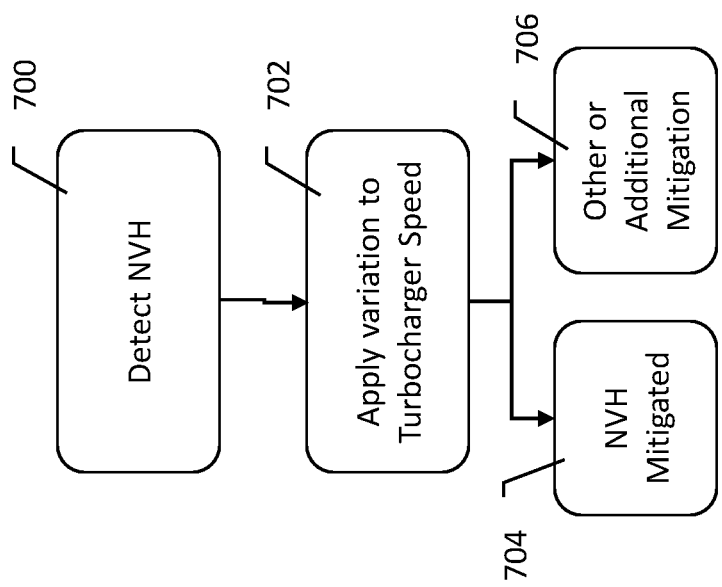
FIG. 10 illustrates a method to mitigate noise, vibration or harshness (NVH)

FIG. 10 illustrates a method to mitigate noise, vibration or harshness (NVH). Here, one or more sensors associated with the engine can be configured to identify NVH signals above a threshold. For example, the output of a motion sensor may be monitored to identify "normal" or "baseline" noise/vibration levels. For example, an average value of the power of motion sensor output within a frequency band for NVH (or at least the noise and vibration elements thereof) can be determined and used as a baseline. If/when the output of the sensor rises above the baseline by a threshold percentage, amount, or other measure (such as by a number of standard deviations of the average output), NVH outside of the baseline is detected at 700. Alternatively, an NVH threshold may be set by reference to an external standard, to a human perception threshold, or to a system/vehicle level requirement. Block 700 may then use the NVH threshold set or determined by reference to any such standard, perception threshold, or system/vehicle level requirement.

Variations to the turbocharger speed 702 can then be applied at 702. The method then determines whether the NVH has been mitigated, as indicated at 704 and, if not, another mitigation can be implemented as noted at 706.

Figure 11:
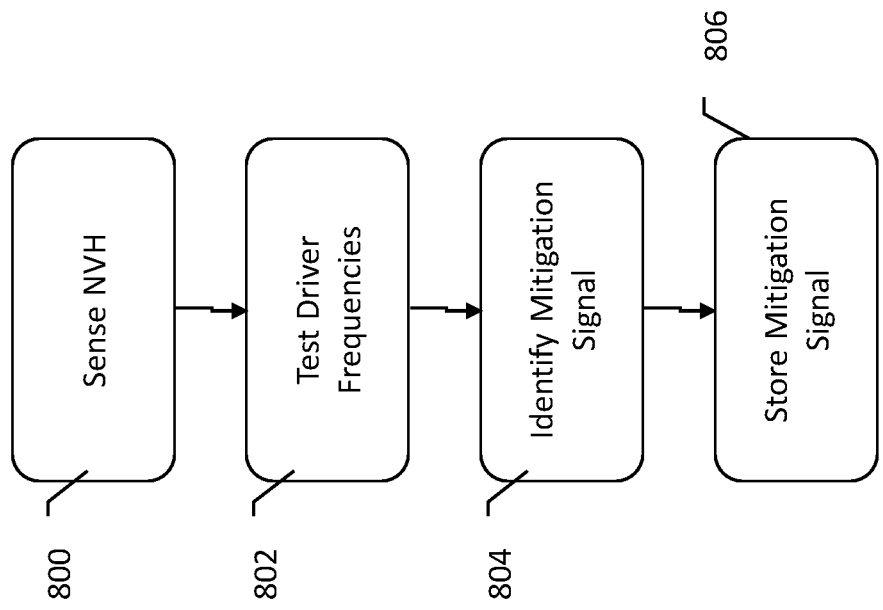
FIG. 11 shows an illustrative method for identifying a mitigating driver signal.

FIG. 11 illustrates an alternative approach in which a mitigating driver is identified. Here, NVH conditions are sensed as indicated at 800. Alternatively, surge can be sensed, if desired, using parameters discussed above. Next, one or more driver frequencies are tested, as indicated at 802. Block 802 may be performed by, for example, controlling the ETurbo motor to cause variations in the compressor speed, such as shown above in FIGS. 5-7. In other examples, block 802 may be performed by controlling an e-compressor having an electric motor coupled to the compressor shaft, with or without a turbine present, to cause variations in compressor speed. As these variations are applied, the system continues to monitor NVH to see if the NVH improves, or gets worse, with the applied variations. The variations are then changed. In some examples, the amplitude and/or frequency of the variations are modified within a predetermined range, at a selected periodicity. For example:

Apply a 2000 RPM variation about the setpoint within 0.5 seconds (2 Hz);

Apply a 4000 RPM variation about the setpoint within 0.1 seconds (10 Hz);

. . .

Apply a 10,000 RPM variation about the setpoint within 0.01 seconds (100 Hz).

The above shows a fixed compressor speed test variation scheme. Rather than fixed RPM, the variations can use a relative approach by defining the test steps using percentages of the setpoint (1%, 2%, 4%, 10%, etc.). Both frequency and amplitude are modified in this set of examples; in other examples either frequency or amplitude may be modified. For example, a relatively high amplitude variation may be applied using a range of frequencies until an effective frequency is identified, and then the amplitude of variation may be reduced, if desired, until a minimum amplitude at which mitigation occurs is found. When the NVH condition improves at a given tested variation is identified as a mitigation signal at 804, and the features of the identified test variation or mitigation signal are stored at 806 for use in mitigating sensed NVH (or surge) conditions. In some examples, the frequency that is found effective for NVH may be presumed to also be effective for surge mitigation, if desired. FIG. 11 allows the mitigation to be identified without needing to characterize the underlying surge or other source of NVH.

FIG. 11 can be used as the predicate for a range of different solutions. In one example, after storing the identified test variation or mitigation signal, during a later operation of the engine, a method of NVH mitigation may include sensing an NVH condition and using the stored NVH mitigation to vary compressor speed to mitigate the NVH condition. In another example, during the later operation of the engine, the method can include sensing a surge condition; and using the NVH mitigation to vary compressor speed to mitigate the surge condition. In some examples, the NVH mitigation may use a first amplitude and/or frequency, and a separate surge mitigation, specific to known surge inputs, may be derived from the NVH mitigation such as by changing to a second amplitude (possibly a higher amplitude for surge than for NVH) or a different frequency, if desired. In another example, during the later operation of the engine, the system controller may operate by determining that operating setpoints of the engine system are near a surge line for the compressor; and using the NVH mitigation to vary compressor speed to prevent surge while operating near the surge line. In some examples, the NVH response may be amplified for purposes of addressing a surge condition by, for example, increasing the amplitude or frequency of the NVH response, allowing the NVH response to be used to vary compressor speed by adjusting (such as increasing) the amplitude thereof for surge conditions or surge occurrence, rather than NVH.

One cause for surge can arise when the throttle of the engine system, which resides between the compressor and the engine intake manifold in the airflow of the engine, is closed. In one example, NVH or surge mitigation may be performed using the method of FIG. 11 to set/store a mitigation signal. Then, during a later operation of the engine, responsive to a command, the system closes the throttle and, in response to the throttle closing, the system uses the NVH mitigation to vary compressor speed to prevent NVH responsive to the throttle closing. Alternatively, the system may use the NVH mitigation to vary compressor speed and prevent surge responsive to the throttle closing.

In some methods, an NVH condition can be identified and used as a trigger for either testing possible compressor-based mitigations, as shown in FIG. 11, or as a trigger for applying a stored mitigation. However, there can be many NVH sources in a vehicle. Therefore in some examples additional steps can be taken to first determine whether the sensed NVH is likely or possibly linked to compressor operation. For example, methods and systems may analyze an operational state of the compressor, to determine whether the compressor is operating in proximity to a surge line. If so, the method may then conclude that the compressor is a potential source of the NVH before varying the speed of the compressor for test or mitigation purposes. The determination of whether the compressor is operating in proximity to a surge line may be performed using compressor map data.

In the preceding, system and method examples are explained. Any method example may also be considered a system example, and vice versa. Thus the above includes methods performed in compressors, turbochargers, partial engine builds, and complete engine systems. Additionally included are compressors, turbochargers, partial engine builds, and complete engine builds having controllers configured to perform the above discussed methods. The controllers associated with such systems may be as described above relative to ECU 150, for example, and may include a microcontroller or microprocessor, state machine, or other processing unit, along with associated analog and digital circuitry as well as memory for storing in non-transitory and/or tangible media one or more instruction sets, configurations, etc. for performing the methods described.

Each of these non-limiting examples can stand on its own, or can be combined in various permutations or combinations with one or more of the other examples. The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like. The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method of operating a compressor in an engine system comprising:
   receiving a command to operate the compressor at a speed setpoint in an operating region of the compressor near a surge region of the compressor; and
   varying a speed of the compressor above and below the speed setpoint to provide an average speed at the speed setpoint to mitigate surge; wherein the compressor is driven by a shaft which is coupled in turn to an electric motor for providing torque to the shaft, and varying the speed of the compressor is performed by varying a control signal provided to the electric motor causing the torque to vary.

2. The method of claim 1 wherein the compressor has an air intake and an air output, the engine has an intake manifold and an exhaust manifold with one or more combustion cylinders coupled to each manifold, and the compressor air output is provided to the intake manifold.

3. The method of claim 1 wherein the step of varying the speed of the compressor comprises varying the compressor speed within boundaries set using a resonant frequency of surge vibrations for the engine system, wherein the boundaries are set above and below the speed setpoint and determined using the resonant frequency of surge vibrations.

4. The method of claim 1 wherein the compressor is part of a turbocharger having:
   the compressor;
   a turbine;
   the shaft, wherein the shaft couples the turbine to the compressor; and
   the electric motor; further wherein the turbocharger is coupled to the engine as follows:
   the compressor is configured to provide compressed air to an intake manifold of the engine; and
   the turbine is configured to receive exhaust gasses expelled at an exhaust manifold of the engine.

5. The method of claim 4 wherein the electric motor is configured to draw torque from the shaft, and varying the speed of the compressor further comprises controlling the electric motor to draw torque from the shaft.

6. A method of configuring and operating a turbocharger to operate in association with an engine, the method comprising:
   operating the turbocharger to generate a surge condition;
   measuring a resonance associated with the surge condition and storing data related to a frequency of the resonance;
   setting a speed variable for use in operation of the turbocharger in the region of the surge condition using the stored data related to the frequency of the resonance; and
   operating the turbocharger in the region of the surge condition by varying speed of the turbocharger using the speed variable.

7. The method of claim 6 wherein the turbocharger comprises:
   a compressor;
   a turbine;
   a turbocharger shaft coupling the turbine to the compressor; and
   an electric motor configured to apply torque to the turbocharger shaft; further wherein the turbocharger is coupled to the engine as follows:
   the compressor is configured to provide compressed air to an intake manifold of the engine; and
   the turbine is configured to receive exhaust gasses expelled at an exhaust manifold of the engine;
   wherein operating the turbocharger in the region of the surge condition by varying speed of the turbocharger using the speed variable comprises controlling electrical power provided to the electric motor.

8. The method of claim 7 wherein the electric motor is configured to draw torque from the turbocharger shaft, and operating the turbocharger in the region of the surge condition by varying speed of the turbocharger using the speed variable further comprises controlling the electric motor to draw torque from the turbocharger shaft.

9. The method of claim 7 wherein operating the turbocharger in the region of the surge condition by varying speed of the turbocharger using the speed variable is performed by:
receiving a target speed setpoint;
varying the speed of the turbocharger about the target setpoint to cause an average speed of the turbocharger to match the target speed setpoint.

10. A method of mitigating noise, vibration and harshness (NVH) of an engine system having an engine with an intake manifold and a compressor for compressing air entering the intake manifold, the method comprising:
sensing presence of NVH above a threshold for NVH;
varying a speed of the compressor about a speed setpoint using at least one compressor speed test variation; and
identifying a compressor speed test variation that causes a reduction in the sensed NVH.

11. The method of claim 10 wherein the at least one compressor speed test variation is configured as a fixed variation of compressor speed about the speed setpoint.

12. The method of claim 10 wherein the at least one compressor speed test variation is configured as a relative variation of compressor speed about the speed setpoint.

13. The method of claim 10 further comprising storing the identified compressor speed test variation as an NVH mitigation; and
during a later operation of the engine:
sensing an NVH condition; and
using the NVH mitigation to vary compressor speed to mitigate the NVH condition.

14. The method of claim 10 further comprising storing the identified compressor speed test variation as an NVH mitigation; and
during a later operation of the engine:
sensing a surge condition; and
using the NVH mitigation to vary compressor speed to mitigate the surge condition.

15. The method of claim 10 further comprising storing the identified compressor speed test variation as an NVH mitigation; and
during a later operation of the engine:
determining that operating setpoints of the engine system are near a surge line for the compressor; and
using the NVH mitigation to vary compressor speed to prevent surge while operating near the surge line.

16. The method of claim 10 wherein the engine system comprises a throttle between the compressor and the engine intake manifold, the method further comprising storing the identified compressor speed test variation as an NVH mitigation; and
during a later operation of the engine:
responsive to a command, closing the throttle; and
using the NVH mitigation to vary compressor speed to prevent NVH responsive to the throttle closing.

17. The method of claim 10 wherein the engine system comprises a throttle between the compressor and the engine intake manifold, the method further comprising storing the identified compressor speed test variation as an NVH mitigation; and
during a later operation of the engine:
responsive to a command, closing the throttle; and
using the NVH mitigation to vary compressor speed to prevent surge responsive to the throttle closing.

18. The method of claim 10 further comprising analyzing an operational state of the compressor, determining that the compressor is operating in proximity to a surge line, and concluding that the compressor is a potential source of the NVH before varying the speed of the compressor.

19. The method of claim 18 wherein determining that the compressor is operating in proximity to a surge line is performed by reference to data from a compressor map.

* * * * *